Aug. 14, 1956 G. A. BRACE 2,758,667
SUCTION CLEANERS

Filed Jan. 7, 1954 3 Sheets—Sheet 1

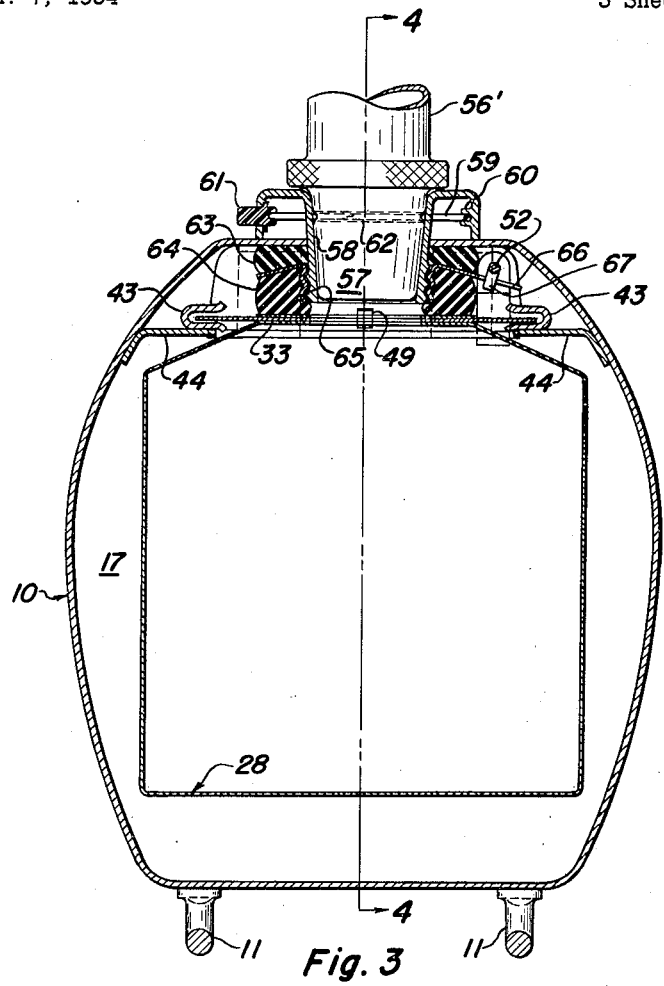
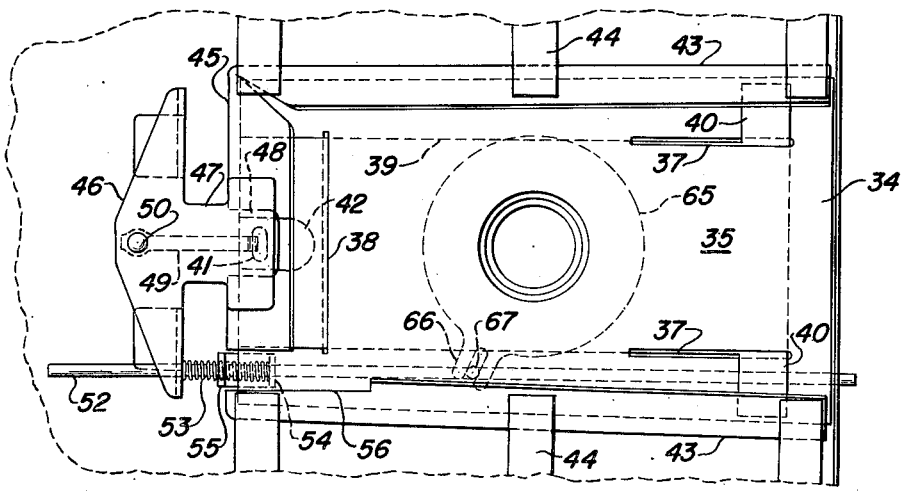

Aug. 14, 1956  G. A. BRACE  2,758,667
SUCTION CLEANERS

Filed Jan. 7, 1954  3 Sheets-Sheet 3

United States Patent Office 2,758,667
Patented Aug. 14, 1956

2,758,667

SUCTION CLEANERS

George A. Brace, Highland Park, Ill., assignor to The Hoover Company, North Canton, Ohio, a corporation of Ohio Application January 7, 1954, Serial No. 402,719

11 Claims. (Cl. 183—37)

This invention relates to suction cleaners and more particularly to a novel arrangement for mounting a disposable paper filter therein of unique design and featuring a valve which closes the filter inlet as an incident to the removal of the filter from the cleaner.

A primary object of the invention is to provide a cleaner of simplified design employing a throw-away paper filter arranged to be assembled to the cleaner simply by slipping a mounting plate carried by the filter across a suitable supporting means within the filter chamber and closing the access cover. Associated with the filter supporting means is a spring actuated filter ejector which is rendered operative by the release of the access cover to not only eject the filter but to close the valved filter inlet opening thereby positively safeguarding against the escape of dust and unsanitary matter from the filter while it is being discarded.

Another feature of the construction is an arrangement whereby the closing of the filter access cover shifts the filter to its fully assembled position, engages the inlet valve with the closing device therefor, cocks the filter ejector and shifts a sealing gasket into engagement with the filter in the area surrounding its inlet opening. Each of the foregoing operations is performed automatically and without the operator having to give attention to carrying out operations in any sequence.

Accordingly, it is an object of the invention to provide a suction cleaner of simple and inexpensive construction having various convenient features closely associated with the use therein of a throw-away paper filter.

Another object is the provision of a low cost paper filter bag having novel means for mounting the same in a filter chamber and incorporating a valve for the inlet opening.

Yet another object is the provision of a cleaner with novel means for closing the inlet opening of a disposable filter bag as an incident to the removal of the filter from the cleaner.

Still another object is the provision of a unique filter ejector operative to disconnect the air inlet coupling from the filter and to eject the filter from the filter chamber as the access cover thereto is opened.

Numerous other objects and advantages of the invention will become apparent from the following detailed specification of an illustrative embodiment taken in connection with the accompanying drawings, wherein:

Figure 2 is a fragmentary plan view taken along line 2—2 on Figure 1 and showing certain details of the filter supporting means, the filter ejector, and other components;

Figure 3 is a vertical sectional view taken crosswise of the filter chamber along line 3—3 on Figure 1;

Figure 1:
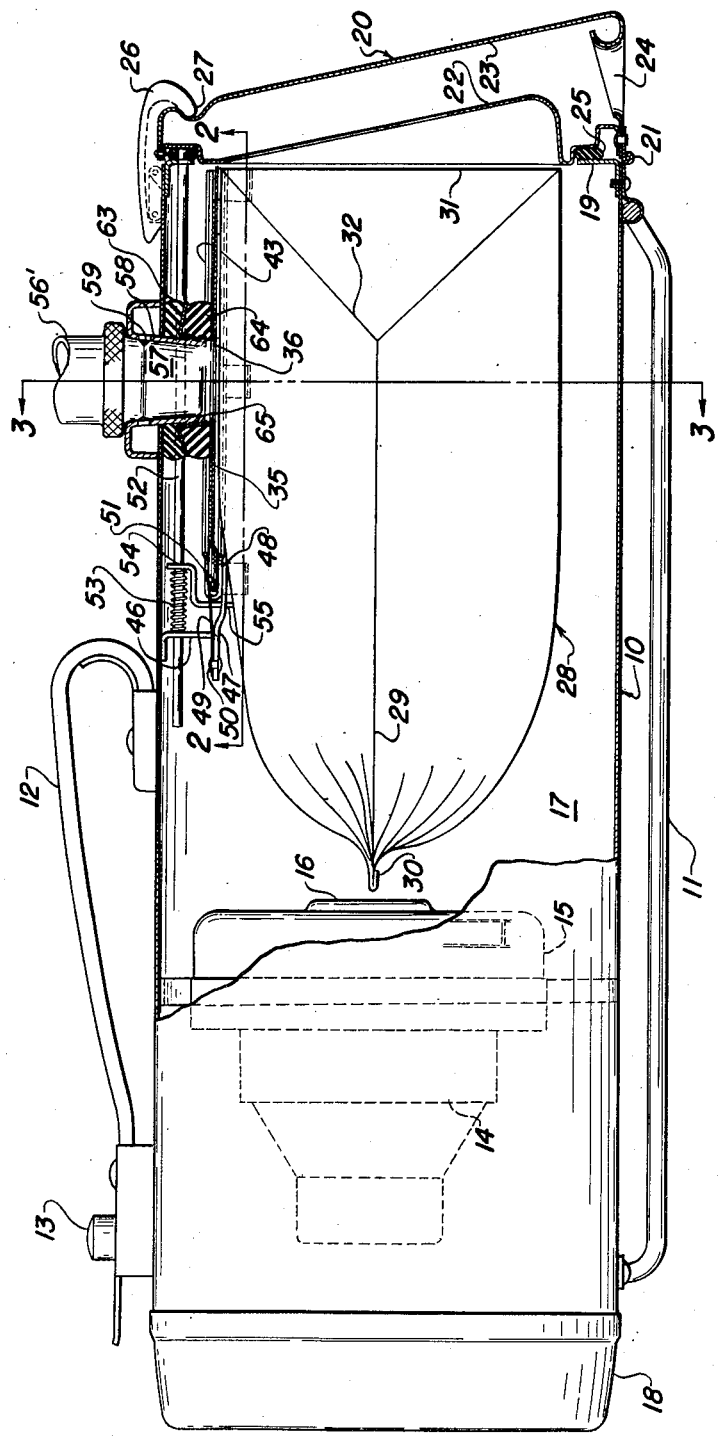
Figure 1 is a side elevational view of a tank cleaner showing the filter chamber broken away and a filter bag in place therein.

As illustrated, the invention is incorporated in a suction cleaner having a tubular casing 10 supported on a pair of skids 11 and having a carrying handle 12 secured to its upper side. A switch button 13 of an electric switch is supported on one end of the handle. The switch controls an electric motor 14 directly coupled to a multiple stage suction fan 15 having an axially disposed inlet opening 16 at its forward end. It will of course be understood that the motor-fan unit is suitably supported at the rear end of the casing and includes a partition, not shown, separating the casing into two compartments. The larger one of these occupies the entire forward end of the casing and constitutes a filter chamber 17 housing a disposable filter bag. The air entering the fan is discharged therefrom to the rear of the partition and flows over the motor to cool it on its way to an exit opening in the flat end of end cap 18.

The forward end of the casing is entirely open and provided with a flange reinforcing ring 19 against which a sealing gasket carried by the rim of the end cap seats. The open end of the filter chamber is closed by a closure member or end cap generally designated 20 having its lower rim hinged to the cleaner casing at 21. As shown, the end cap is provided with inner and outer walls 22 and 23 having their rim edges suitably secured together as by rivets or the like. The lower rim of the end cap may be provided with an opening 24 providing a handle which may be grasped by the operator's fingers as a convenience in carrying the cleaner from place to place. Secured in the base of a depression surrounding the rim of inner wall 23 is a resilient sealing gasket 25 which seats against ring 19 in accordance with customary practice. End cap 20 is normally held closed with the gasket seated against ring 19 by a well-known form of toggle clamp 26 secured to the top of the cleaner casing and having a hooked end 27 engageable with a depression in the face of the end cap.

Figure 5:
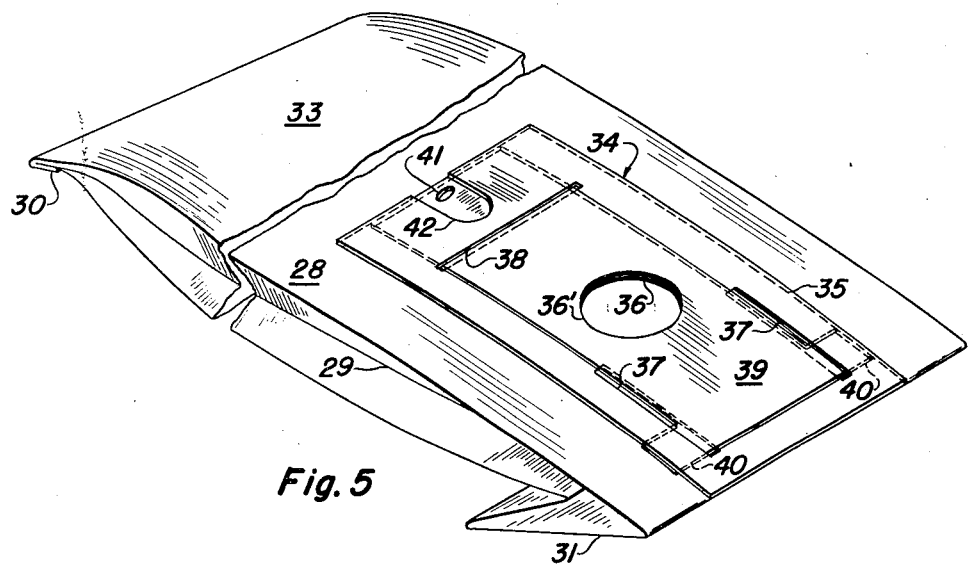
Figure 5 is an isometric view of a filter bag showing details of the mounting plate and the valve for the inlet opening.

The cleaner is designed to use an inexpensive throw-away paper filter bag generally designated 28 and best shown in Figure 5. This filter is preferably made from a single sheet of air pervious material. It comprises a tubular main body preferably creased longitudinally thereof along its opposite sides to provide one or more inwardly extending pleats 29. The inner end of the bag may be folded over as indicated at 30 and stitched or glued to one of the flat side walls to hold this end closed. The flat and pleated side walls at the opposite or forward end of the filter are turned inwardly in overlapping relation and sealed to form a closed flat end wall 31. This folding operation is similar to that employed in making ordinary paper grocery sacks. The pleated portions of the bag adjacent the end are creased along diagonal lines 32 as indicated in Figure 1, so that the bottom of the bag can be folded flat against the lower flat side wall of the filter for compact packaging and storage.

The upper flat side wall 33 of the filter is provided with a combined mounting plate and valve assembly generally designated 34. This facility comprises a stiff cardboard or the like plate 35 having a centrally disposed inlet opening 36 therethrough. This opening registers with a similar opening through wall 33 of the filter. Plate 35 is glued or otherwise firmly secured to the filter bag in a ring-shaped area surrounding the inlet opening. The width of this ring may be of the order of one-half to one inch or more but does not include a strip along either lateral edge of plate 35. Hence, the edge portions of the plate are free and unattached to the filter bag as best shown in Figure 3 and for a purpose which will be explained shortly. Likewise, the opposite ends of plate 35 are preferably unsecured to the filter wall. The mounting plate is provided with a pair of slots 37, 37 extending parallel to one another adjacent the forward end of the plate. Extending transversely of the plate near its inner or rear end is a similar slot 38 having a length substantially equal to the distance between slots 37. Slidably mounted in slots 37 and 38 and held captive thereby is a valve member 39 of hard finished paper or the like. The width of the valve member is slightly less than the length of slot 38. The forward end of the valve is provided with a pair of tabs 40, 40 which extend through slots 37, 37 from the upper side of the mounting plate, as made clear by Figure 5. It will also be observed that the rear end of the valve passes through slot 38 from the upper side of the mounting plate and terminates opposite the rear end of the plate. The rear end of the valve is provided with a small opening 41 and this opening is normally located centrally of a notch 42 opening through the rear end of the mounting plate. As manufactured, the inlet opening 36' in the valve registers with openings 36 in the mounting plate and in the top wall of the filter bag. When these openings are so aligned, the forward edges of tab 40 are located at the forward ends of slots 37.

From the foregoing it will be evident that valve 39 is freely slidable lengthwise of the mounting plate a distance limited by the length of slots 37. This length is such that when tabs 40 are at the forward end of the slots, inlet openings 36 and 36' are in alignment and such that they are out of alignment when the tabs engage the stops provided by the opposite rear ends of the slots.

The means for supporting the filter in the filter chamber comprises U-shaped channel members 43 lying in a common plane and supported adjacent the top side of the filter chamber by bracket members 44. A similar channel member 45 extends across and interconnects the rear ends of channels 43, as made clear by Figure 2. Channel member 45 may be supported from the top wall of the casing by a T-shaped bracket member 46 having a tab 47 extending forwardly and underlying the under side of channel 45. Both the upper and lower walls of channel 45 are notched at 48 in the area opposite notch 42 of the mounting plate. The guideways provided by channels 43 and 45 are slightly wider than the thickness of the mounting facility 34 and otherwise designed and arranged to receive the mounting plate from the open front end thereof easily and readily.

Although the slide valve 39 may be manually closed after the filter is removed from the cleaner, it is preferred to close the same automatically. This is accomplished by the light leaf spring 49 the rear end of which is secured to support 47 by a rivet 50. Its forward end is provided with a cammed hook 51 shaped as indicated in Figure 1 so as to over-ride the valve and engage in opening 41 thereof as the filter is slid into place in channels 43 and 45. Thus, it will be clear that as the mounting plate is assembled and pushed forward in the guide channels, the innermost end of the valve contacts the hooked end of the spring and deflects it upward until the hook engages in opening 41. Thereafter, if the filter and mounting plate are withdrawn from the filter chamber, hook 51 will move the valve out of registry with the filter inlet and close it. As soon as tabs 40, 40 of the valve strike the end of slots 37 further relative movement between the valve and plate will cease and hook 51 will tear through the inner end of the valve member thereby disengaging the hook from the valve.

The ejector means for ejecting the filter comprises an ejector rod 52 slidably supported along the upper inner side of the cleaner casing. To this end, the inner end of rod 52 passes through an opening in bracket member 46 while the forward end of the rod is slidably supported in an opening formed in ring 19. A compression spring 53 encircles the rod with one end resting against bracket 46 and the other against a stop 54 secured to the ejector rod. An L-shaped extension 55 projects downwardly from member 54 to a position opposite the rearmost edge of mounting plate 35 for the filter bag. When spring 53 is free to move the ejector rod to the right, as viewed in the drawings, L-shaped member 55 is carried along therewith and into a notch 56 cut through channel member 45. Note that this notch also extends along the inner edge of the righthand channel 43, as best shown in Figure 2. It will therefore be clear that member 55 is effective to slide the filter mounting plate to the right to eject the filter appreciably from the open end of the filter chamber. Normally the filter ejector is held in its retracted position and spring 53 is held compressed by the contact of the end cap with the exposed outer end of the ejector rod. However, as soon as the end cap is unlatched and allowed to open, spring 53 snaps the rod forwardly and moves member 55 into contact with the filter mounting plate and ejects the filter.

The simple and effective means for coupling the suction hose to the filter inlet and forming a feature of the invention will now be described. Referring to Figure 1 it will be seen that the suction hose 56' has a tapered socket 57 which seats in a similarly shaped female coupling member 58 fixed to the top side of the cleaner casing. The hose is detachably and swivelly held in place in the socket by a spring latch wire 59 of generally elliptical shape. The rear end of the latch spring is suitably supported at 60 in the hose socket while the opposite end carries a push button 61 projecting through an opening in the hose socket. The tapered end of the hose is provided with a continuous groove 62 positioned to seat the opposite sides of spring 59 as the hose is seated in the socket. The hose is released by pushing inwardly on button 61 to expand the opposite sides of the spring and release them from groove 62.

Surrounding the inner end of socket 58 are a pair of resilient sponge rubber gaskets 63 and 64. The lower gasket member 64 is fixed to a flanged collar 65. This collar is provided with screw threads which mate with screw threads on the exterior of socket 58. These threads are of rather high pitch so that rotation of collar 65 through a small angle suffices to shift gasket 64 for a substantial distance axially of the hose socket. Projecting radially from the flange on collar 65 is a forked tab 66 in which is seated a lug 67 projecting downwardly from the filter ejector rod 52. Accordingly, it will be understood that as the ejector rod is moved back and forth it is operative through tab 66 and collar 65 to rotate sealing gasket 64. While the sealing gasket is rotated only through a small angle, this angle is sufficient to move the gasket into and out of sealing contact with mounting plate 35 for the filter bag. Of course, as the ejector rod moves outwardly to lift the sealing gasket out of contact with the filter mounting plate, upper gasket 63 is compressed. And conversely, as the filter rod is moved to its retracted position in response to the closing of the end cap, sealing gasket 64 is rotated in a direction to lower it into firm and airtight sealing engagement with the filter plate. More accurately, the gasket is depressed against valve 39 and depresses the valve snugly against the top side of the mounting plate.

Operation

Figure 4:
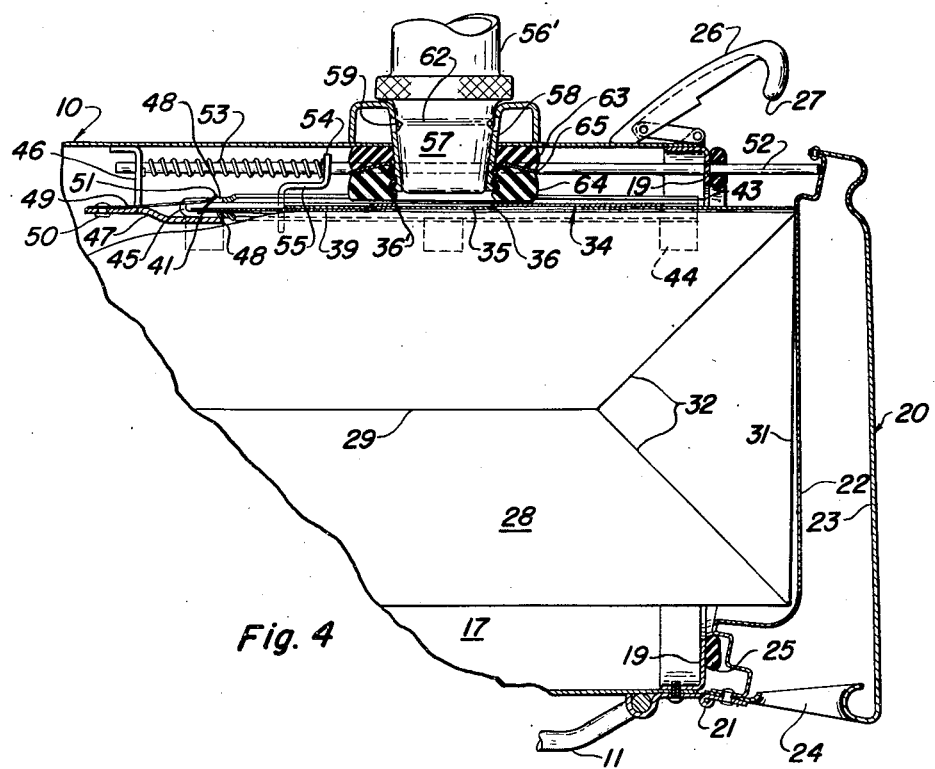
Figure 4 is a fragmentary vertical sectional view through the filter chamber showing the position of parts after the end cap has been opened and the filter has been partially ejected.

The operation of the construction will be quite apparent from the foregoing description. Let it be assumed that the end cap 20 is open in readiness for the assembly of a new filter and that the cleaner is upended on its rear end cap 18. The operator takes a new filter 28 from its shipping carton in a collapsed condition and with the flat bottom 31 folded downwardly against the lower side of the bag. Grasping the outer end of the mounting plate, the operator inserts the filter downwardly into the casing with the inner end of the mounting plate supported between the opposite sides of U-shaped channel members 43, 43. The filter drops freely into the cleaner until the inner end of the mounting plate strikes the ejecting bracket member 55. At this time the forward end of the ejector rod and the end of the filter mounting plate will occupy the positions shown in Figure 4. The end cap is then swung toward closed position. As this takes place, its inner wall contacts the protruding ends of the mounting plate and of the ejector rod, moving both inwardly as the cap closes. As the inner end of the valve contacts the cammed end 51 of valve operating spring 49, the spring is caused to override the valve until the hook springs into opening 41 of the valve. At the same time, the retraction of the ejector compresses spring 53 and also rotates collar 65 carrying sealing gasket 64 and lowers it into airtight sealing engagement with the area of the mounting spring surrounding inlet opening 36.

As the motor-fan unit is placed in operation, the incoming air inflates the filter to the fully expanded condition illustrated in Figure 1. The attachment of the suction hose 56 to socket 58 enables the operator to conduct dirt laden air into the filter bag where the dirt collects as the air passes through the filter to fan inlet 16.

After the filter has become filled with dirt, it is a simple matter to replace it with a clean filter. The cleaner is again upended onto end cap 18 and toggle clamp 26 is opened to release the end cap. As soon as the end cap starts to open, spring 53 projects rod 52 upwardly and rotates sealing gasket 64 out of contact with the filter mounting plate. As this occurs, member 55 contacts the innermost end of the mounting plate and shifts it upwardly to positively eject the filter from the cleaner casing. Since hook 51 is engaged in opening 41 of valve 39, the valve will lag behind the filter and close opening 36. When tabs 40 of the valve contact the inner ends of slots 37, hook 51 will tear through the end of the valve and become disengaged therefrom. All that remains is for the operator to grasp the fully exposed outer end of the mounting plate and carry the filter to a point of disposal without danger of its contents escaping. A new filter is installed in the manner described above and the cleaner is returned to operation.

The arrangement of parts just described has many advantages most of which will be self-apparent from the drawings and foregoing discussion. The location of the swivelling inlet hose coupling on top of the cleaner casing enables the operator to clean with equal facility from all positions with respect to the cleaner thereby practically eliminating the need for moving the cleaner while cleaning a given room. Another advantage is that the filter is suspended centrally within the filter chamber from the mounting plate secured along its upper side wall. This arrangement provides a very simple and effective means for holding the filter side walls properly spaced from the filter chamber itself so as not to interfere with the air flow. It will also be evident that the filter mounting and ejecting facilities overlie the filter and occupy a space not efficiently utilized in conventional cleaners.

While the particular arrangement and construction illustrated is preferred, it will be understood that numerous changes may be made in practicing the principles of the invention. For example, the hose inlet connection can be relocated to either side, the bottom or the end of the cleaner casing. Likewise, the filter bag may take many forms other than that shown, as can the mounting plate and sanitary dirt valve.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. A suction cleaner having a filter chamber provided with a large area access opening, normally closed cover means for said access opening, a paper filter bag closed except for a small area inlet opening, a relatively stiff mounting plate secured to said filter about said inlet opening, means carried by said filter chamber for slidably receiving and supporting said filter from the opposite lateral edges of said mounting plate, said filter chamber having a fixed air inlet conduit independent of said cover extending therethrough and terminating opposite said filter inlet when the same is seated on said filter supporting means, a resilient gasket surrounding the inner end of said air inlet conduit, and means for moving said gasket axially of the air inlet conduit into firm seating engagement with said mounting plate to form an air tight seal therewith.

2. In combination with the filter chamber of a suction cleaner, said chamber having a normally closed filter access opening in its end wall, a filter bag within said chamber and having an air inlet mouth in one wall thereof, a mounting plate fixed to said filter bag about said inlet mouth and having opposite lateral rims, channeled filter supporting means secured to the interior side wall of said chamber and having open ends adjacent said access opening and being arranged to receive and support the opposite lateral rims of said mounting plate, a fixed air inlet conduit extending through the wall of said chamber and terminating adjacent the plane of said channeled filter supporting means in alignment with said inlet mouth, a resilient sealing gasket surrounding the inner end of said fixed conduit, and means for moving said gasket with respect to said fixed conduit into and out of sealing engagement with said mounting plate when said filter bag is in place on said channeled filter supporting means.

3. In combination with a suction cleaner having a tubular casing housing a motor driven suction unit and a filter chamber, said chamber having a large area access opening in an end wall thereof and a relatively small area inlet passage in a wall other than the end wall, a cover normally closing said access opening, guideway means carried by said chamber in a plane substantially parllel to the inner end of said air inlet passage and closely adjacent thereto, said guideway means having a receiving end adjacent said large area access opening for receiving the mounting plate of a disposable paper filter bag, spring actuated filter ejector means movable lengthwise of said guideway means and toward said access opening and operable to engage a filter mounting plate and eject the same outwardly through said access opening when released, said cover abutting said filter ejector to hold the ejector retracted in opposition to said spring until the operator wishes to remove a filter bag from said chamber and the cover is removed from the access opening.

4. A suction cleaner filter chamber having a large area access opening, a disposable paper filter bag in said chamber having a tubular body closed at its opposite ends, an inlet opening through a side wall of said tubular body, a stiff mounting plate having an opening therethrough, the juxtaposed rim areas of both said last mentioned openings being secured together in an air tight manner leaving the marginal rim portions of the mounting plate free, guideways extending along the side wall of said filter chamber spaced to engage and support the opposite lateral rims of said mounting plate when inserted thereover through said access opening, conduit means extending through the wall of said chamber positioned to conduct dirt laden air into said filter through the inlet opening thereof and including resilient gasket means engageable with the outer surface of said mounting plate in the area surrounding the inlet opening therethrough to form an air tight seal therewith, a spring actuated filter ejector movably supported adjacent said mounting plate, said ejector when released being engageable with an edge of said mounting plate to eject said filter and its contents outwardly through the access opening, and a closure member for the access opening, said filter ejector abutting said closure member and being held in a retracted position thereby in opposition to said spring so long as said closure member is secured in place over said access opening.

5. In combination, a filter chamber having means for receiving and positioning a disposable paper filter bag therein, a paper filter bag mounted in said positioning means and having an inlet opening in a wall thereof, a plate like valve member, means movably supporting said valve on said filter for movement between an open position clear of said inlet and a closed position across said inlet, means in said chamber automatically engageable with said valve as the filter bag is received by the positioning means and operable to move said valve to the closed position thereof as the filter is withdrawn from said filter chamber and disengaging from the valve after said valve is moved to the closed position thereof, and said chamber having means conducting a dirt laden air stream into said filter through said inlet.

6. In combination, a suction cleaner comprising, a main casing having a base, a motor-fan suction unit supported on said base, and having a suction inlet, a filter chamber opposite said suction inlet, said chamber having a large area access opening, a closure for said opening and forming a part of said filter chamber, a paper filter bag closed except for a small area inlet opening through a wall thereof, a stiff mounting plate secured to the rim portions of said filter inlet opening and having an opening registering with said inlet opening, the rim portions of said mounting plate being free of said filter, a bifurcated filter supporting means supported interiorly of said filter chamber adjacent a wall thereof, said bifurcated supporting means being adapted to underlie the opposite rim portions of said filter mounting plate and to support the filter through said mounting plate, an air inlet conduit extending through the wall of said main casing having its inner end in alignment with the filter inlet when the filter is in place on said bifurcated supporting means, and a resilient gasket carried by the inner end of said conduit adapted to rest against said filter mounting plate and forming an air tight seal therewith, a normally open valve member for said filter inlet supported on said filter mounting plate and movable in the plane thereof to a closed position across said inlet to prevent the escape of dirt during the disposal of the filter bag, spring hook means operable to engage in an opening in said valve member as the filter is slid into place on said bifurcated filter supporting means, said spring hook means being operable to close said valve as the filter is withdrawn from said bifurcated filter supporting means.

7. A suction cleaner filter chamber having a large area access opening, a disposable paper filter bag in said chamber having a tubular body closed at its opposite ends, an inlet opening through a side wall of said body, a stiff mounting plate having an opening therethrough, the rim areas of both said last mentioned openings being secured together in an air tight manner leaving the marginal rim portions of the mounting plate free, guideways extending along a sidewall of said filter chamber spaced to engage and support the opposite lateral rims of said mounting plate when inserted thereover through said access opening, conduit means extending through the wall of said chamber positioned to conduct dirt laden air into said filter through the inlet opening thereof and including resilient gasket means engageable with the outer surface of said mounting plate in the area surrounding the inlet opening therethrough to form an air tight seal therewith, a cover for said access opening sealing the filter chamber, and ejector means for the filter bag engaging the mounting plate, spring means biasing the ejector in a direction to eject the filter bag from the filter chamber, said cover abutting the ejector in opposition to the spring means to maintain the ejector inactive when the cover is in place over the access opening, said ejector operating to eject the filter bag in a direction parallel to the plane of the filter bag inlet opening when the cover is removed from the access opening.

8. In a suction cleaner, a filter chamber including means for mounting a filter bag, said filter bag including an inlet opening for the reception of a dirt laden air stream, a valve member slidably mounted on the filter bag overlying the inlet opening, said valve member including an opening normally aligned with the inlet opening, means fixedly mounted in the filter chamber adapted to engage the valve member when the filter bag is received by the filter mounting means and to slide said valve member across the inlet opening as the filter bag is removed from the mounting means, moving the opening in the valve member out of alignment with the inlet opening in the filter bag to seal the latter.

9. In a suction cleaner, a filter chamber including means for mounting a filter bag, said filter bag including an inlet opening for the reception of a dirt laden air stream, a valve member slidably mounted on the filter bag overlying the inlet opening, said valve member including an opening normally aligned with the inlet opening and an aperture, means fixedly mounted in the filter chamber adapted to engage in the aperture in the valve member when the filter bag is received by the filter mounting means and to slide said valve member across the inlet opening as the filter bag is removed from the mounting means, moving the opening in the valve member out of alignment with the inlet opening in the filter bag to seal the latter.

10. In a suction cleaner as recited in claim 9 in which the means engaging the aperture in the valve member comprises a spring hook, and said aperture being located adjacent an edge of the valve member whereby the spring hook tears through the edge of the valve member after it is moved to sealing position for releasing the filter, and means for automatically ejecting the filter bag from the filter chamber.

11. In a suction cleaner, a casing, a filter in said casing and having a mounting plate provided with an air inlet, means defining an opening in one wall of said casing for inserting said filter into said casing, a cover for said casing opening, an air conduit rigidly mounted on a second wall of said casing and having its inner end communicating with said filter inlet, filter supporting means mounted on said second casing wall and arranged with respect to said opening in said one wall to receive said filter mounting plate as said filter is passed through said opening to place its inlet in alignment with the inner end of said conduit, and resilient means for sealing said filter mounting plate to said inner end of said conduit to form an air seal between said conduit and said filter inlet.

References Cited in the file of this patent

UNITED STATES PATENTS

| 2,192,224 | Forsberg | Mar. 5, 1940 |
| 2,439,182 | Nuffer et al. | Apr. 6, 1948 |
| 2,571,125 | Ferraris | Oct. 16, 1951 |
| 2,580,645 | Doughman | Jan. 1, 1952 |
| 2,646,855 | Senne | July 28, 1953 |

FOREIGN PATENTS

| 932,776 | France | Dec. 1, 1947 |